(12) United States Patent
Jeong et al.

(10) Patent No.: US 9,485,726 B2
(45) Date of Patent: Nov. 1, 2016

(54) METHOD AND APPARATUS FOR ACTIVATING SLEEP MODE OF TERMINAL

(71) Applicant: Samsung Electronics Co., Ltd., Gyeonggi-do (KR)

(72) Inventors: Sang Soo Jeong, Gyeonggi-do (KR); Song Yean Cho, Seoul (KR); Han Na Lim, Seoul (KR); Sang Bum Kim, Gyeonggi-do (KR); Soeng Hun Kim, Gyeonggi-do (KR); Jae Hyuk Jang, Gyeonggi-do (KR); Kyeong In Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

(21) Appl. No.: 14/377,155

(22) PCT Filed: Feb. 5, 2013

(86) PCT No.: PCT/KR2013/000918
§ 371 (c)(1),
(2) Date: Aug. 6, 2014

(87) PCT Pub. No.: WO2013/119021
PCT Pub. Date: Aug. 15, 2013

(65) Prior Publication Data
US 2015/0003312 A1    Jan. 1, 2015

Related U.S. Application Data

(60) Provisional application No. 61/595,646, filed on Feb. 6, 2012, provisional application No. 61/598,858, filed on Feb. 14, 2012, provisional application No. 61/600,055, filed on Feb. 17, 2012.

(51) Int. Cl.
*H04W 52/02* (2009.01)

(52) U.S. Cl.
CPC ..... *H04W 52/0209* (2013.01); *H04W 52/0235* (2013.01); *H04W 52/0212* (2013.01)

(58) Field of Classification Search
CPC .......... H04W 52/02; H04W 52/0209; H04W 52/0261
See application file for complete search history.

(56) References Cited

U.S. PATENT DOCUMENTS

2009/0285157 A1\* 11/2009 Yeoum et al. ................ 370/328
2011/0038347 A1\*  2/2011 Patil et al. .................... 370/331
(Continued)

FOREIGN PATENT DOCUMENTS

| KR | 10-2011-0000479 | 1/2011 |
| KR | 10-2011-0006949 | 1/2011 |
| KR | 10-2011-0126692 | 11/2011 |

OTHER PUBLICATIONS

International Search Report dated May 31, 2013 in connection with International Patent Application No. PCT/KR2013/000918, 5 pages.
(Continued)

*Primary Examiner* — Benjamin H Elliott, IV

(57) ABSTRACT

Provided are a method and apparatus for dormant mode operation in a user equipment. During dormant mode, data transmission between the user equipment and network is suspended. For dormant mode operation, the user equipment determines whether to enter dormant mode, and sends, upon determining to enter dormant mode, a dormant mode entry message containing dormant mode time information to the network.

21 Claims, 19 Drawing Sheets

(56) References Cited

U.S. PATENT DOCUMENTS

2012/0108238 A1* 5/2012 Kim et al. ................. 455/435.1
2012/0320791 A1* 12/2012 Guo et al. ..................... 370/254
2012/0322515 A1* 12/2012 Hwang et al. ................ 455/574
2015/0003312 A1* 1/2015 Jeong et al. .................. 370/311

OTHER PUBLICATIONS

Written Opinion of International Searching Authority dated May 31, 2013 in connection with International Patent Application No. PCT/KR2013/000918, 3 pages.

* cited by examiner

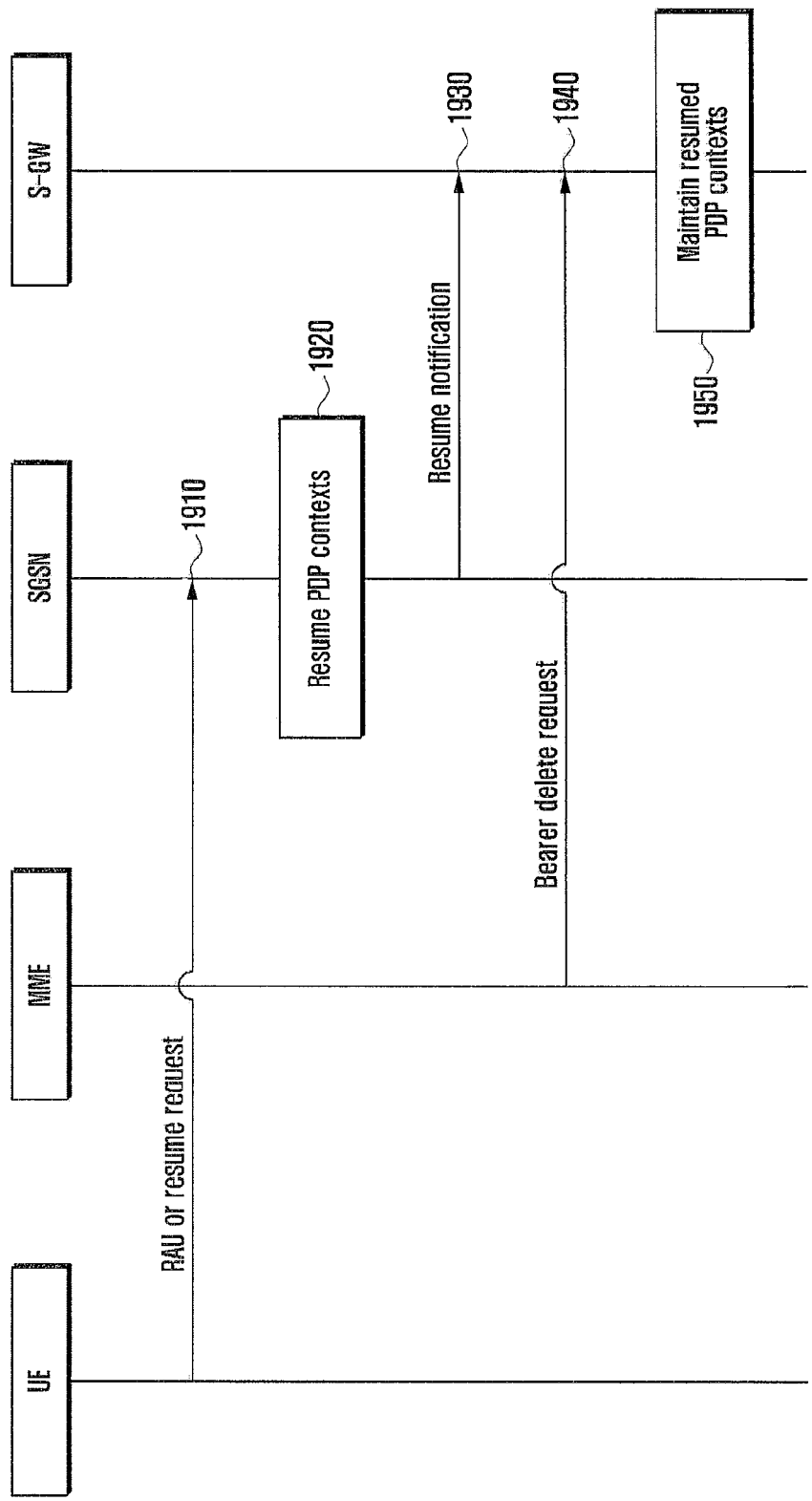

METHOD AND APPARATUS FOR ACTIVATING SLEEP MODE OF TERMINAL

CROSS-REFERENCE TO RELATED APPLICATION(S)

The present application claims priority under 35 U.S.C. §365 to International Patent Application No. PCT/KR2013/000918 filed Feb. 5, 2013, entitled "METHOD AND APPARATUS FOR ACTIVATING SLEEP MODE OF TERMINAL". International Patent Application No. PCT/KR2013/000918 claims priority under 35 U.S.C. §365 and/or 35 U.S.C. §119(e) to U.S. Provisional Patent Application No. 61/595,646 filed Feb. 6, 2012, U.S. Provisional Patent Application No. 61/598,858 filed Feb. 14, 2012, and U.S. Provisional Patent Application No. 61/600,055 filed Feb. 17, 2012, and which are incorporated herein by reference into the present disclosure as if fully set forth herein.

TECHNICAL FIELD

The present invention relates to a method and apparatus for dormant mode operation in a user equipment and, more particularly, to a method and apparatus that control operations of a communication module so as to minimize battery consumption in a user equipment.

BACKGROUND ART

With introduction of smartphones, a variety of user application services are provided. For a smartphone that supports not only voice calls but also various services, unlike an existing mobile phone that is mainly used only for voice calls, it is necessary to have a much advanced scheme for lengthening battery usage time through efficient operation.

In the case of an MTC terminal used for sensing or tracking, it is difficult to charge or replace the battery after initial installation. Hence, it is necessary to have a scheme that can utilize the battery for a long time through efficient operation without manager intervention.

For a user equipment having a communication function such as a smartphone or MTC terminal, a large portion of power consumed in the user equipment is used by the communication module. In particular, the communication module consumes a large amount of power when receiving data from a base station or sending data to a base station. Battery consumption may be reduced by introducing a state during which the communication module is temporarily turned off when an idle time can be predicted because the user equipment has a known pattern of transmission traffic or when it is not necessary to send or receive traffic for a given time.

DISCLOSURE OF INVENTION

Technical Problem

Accordingly, an aspect of the present invention is to provide a method and apparatus that can efficiently operate a communication module of a communication terminal such as a smartphone or MTC terminal so as to minimize battery consumption in the communication terminal.

Solution to Problem

In accordance with an aspect of the present invention, a method for operating a user equipment (UE) in dormant mode is provided. During dormant mode, data transmission between the UE and network is suspended. The method may include: determining whether to enter dormant mode; and sending, upon determining to enter dormant mode, a dormant mode entry message containing dormant mode time information to the network.

In accordance with another aspect of the present invention, a method performed by the network to handle operations of a user equipment (UE) in dormant mode is provided. During dormant mode, data transmission between the UE and network is suspended. The method may include: sending a message indicating dormant mode supportability of the network to the UE; receiving a dormant mode entry message containing dormant mode time information from the UE; and suspending, upon reception of the dormant mode entry message, data transmission for the UE.

In accordance with another aspect of the present invention, a user equipment (UE) supporting dormant mode is provided. During dormant mode, data transmission between the UE and network is suspended. The user equipment may include: a transceiver unit to send and receive messages and data to and from the network; and a control unit to control a process of determining whether to enter dormant mode, and sending, upon determining to enter dormant mode, a dormant mode entry message containing dormant mode time information to the network.

In accordance with another aspect of the present invention, a node of a network for handling operations of a user equipment (UE) in dormant mode is provided. During dormant mode, data transmission between the UE and network is suspended. The node may include: an interface unit to send and receive messages and data to and from the UE and other nodes of the network; and a control unit to control a process of sending a message indicating dormant mode supportability of the network to the UE, receiving a dormant mode entry message containing dormant mode time information from the UE, and suspending, upon reception of the dormant mode entry message, data transmission for the UE.

In accordance with another aspect of the present invention, a node of a network for handling operations of a user equipment (UE) in dormant mode is provided. During dormant mode, data transmission between the UE and network is suspended. The node may include: an interface unit to send and receive messages and data to and from other nodes of the network; and a control unit configured to suspend, when a suspend request message indicating UE entry into dormant mode is received from the MME of the network, transmission of downlink data addressed to the UE.

Advantageous Effects of Invention

In a feature of the present invention, the method and apparatus for dormant mode operation may cause the user equipment to enter a dormant mode during which data transmission between the user equipment and network is suspended, minimizing battery consumption through efficient utilization of the communication module.

BRIEF DESCRIPTION OF DRAWINGS

FIG. 19 depicts a fourth embodiment of a procedure to handle PS bearers for a user equipment involved in CSFB.

MODE FOR THE INVENTION

Hereinafter, embodiments of the present invention are described in detail with reference to the accompanying drawings. Detailed descriptions of well-known functions and structures incorporated herein may be omitted to avoid obscuring the subject matter of the present invention. Particular terms may be defined to describe the invention in the best manner. Accordingly, the meaning of specific terms or words used in the specification should not be limited to the literal or commonly employed sense, but should be construed in accordance with the spirit of the invention.

The following description of embodiments of the present invention is focused on a wireless communication system based on OFDM, in particular, 3GPP EUTRA standards. However, it should be apparent to those skilled in the art that the subject matter of the present invention is also applicable to other communication systems having similar technical background and channel configurations without significant modification.

Figure 1:
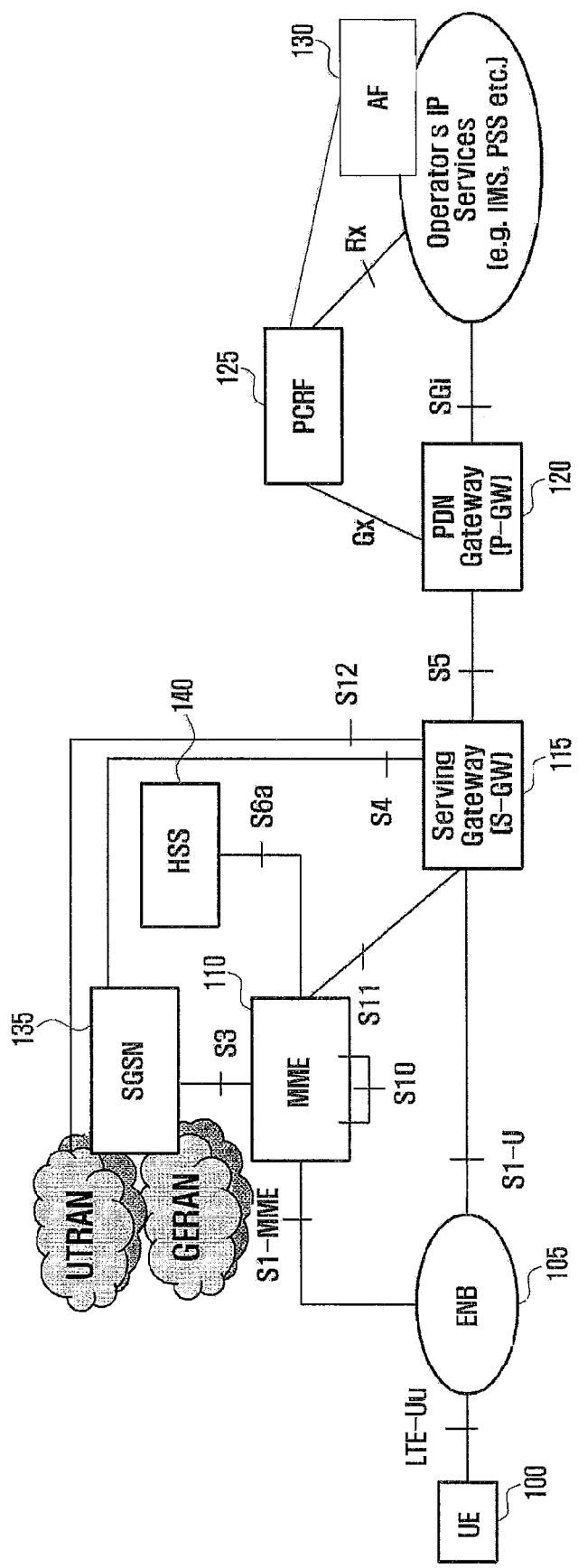
FIG. 1 illustrates an architecture of the LTE mobile communication system.

FIG. 1 illustrates an architecture of the LTE mobile communication system.

Referring to FIG. 1, the radio access network (EUTRAN) of the LTE mobile communication system, to which a user equipment (UE) 100 is connected, is composed of an evolved base station (Evolved Node B, ENB or Node B) 105, Mobility Management Entity (MME) 110, and Serving Gateway (S-GW) 115. The UE 100 may connect to an external network through the ENB 105, S-GW 115 and PDN Gateway (P-GW) 120.

Application Function (AF) 130 is an entity that exchanges application related information with the user at an application level. Policy and Charging Rules Function (PCRF) 125 is an entity for controlling policies related to user QoS. Policy and charging control (PCC) rules corresponding to a specific policy are sent to the P-GW 120 for enforcement.

The ENB 105 is a radio access network (RAN) node, which corresponds to the radio network controller (RNC) of the UTRAN system or the base station controller (BSC) of the GERAN system. The ENB 105 is connected with the UE 100 through a wireless channel and functions similarly to the existing RNC or BSC. The ENB 105 may support multiple cells in parallel.

In the LTE system, as all user traffic including real-time services like VoIP (Voice over IP) services is served by shared channels, it is necessary to perform scheduling on the basis of status information collected from UEs 100. The ENB 105 performs this scheduling function.

The S-GW 115 provides data bearers, and creates and releases a data bearer under control of the MME 110. The S-GW 115 has functions similar to those of Serving GPRS Support Node (SGSN) 135 in GERAN (3G network).

The MME 110 performs various control functions, and may be connected to multiple ENBs 105. The MME 110 is also connected with the S-GW 115, P-GW 120 and HSS 140.

Policy Charging and Rules Function (PCRF) 125 is an entity performing overall QoS and charging control functions for traffic.

In general, "UP" refers to a path involving the UE 100, ENB 105, S-GW 115 and P-GW 120, along which user data is sent and received. In this path, wireless channels with severe resource constraints are used between the UE 100 and ENB 105.

In a wireless communication system like LTE, QoS is applied on an EPS bearer basis. One EPS bearer is used to transmit IP flows having the same QoS requirements. QoS parameters such as QoS Class Identifier (QCI) and Allocation and Retention Priority (ARP) may be attached to an EPS bearer. EPS bearers correspond to PDP contexts of the GPRS system.

One EPS bearer may correspond to a PDN connection, which may have an Access Point Name (APN) as attribute. The ENB 105 manages EPS bearers so that they are mapped with logical channels. Hence, in the present invention, EPS bearers and logical channels may be used interchangeably.

As described before, the user equipment may enter battery saving mode or dormant mode to minimize battery consumption when no traffic for transmission or reception is expected.

Specifically, when a user equipment is in dormant mode, it does not have to perform existing idle mode functions. For example, periodic mobility management operations such as TAU/RAU are not performed, and periodic monitoring of the paging channel for receiving paging is not performed. In addition, when a user equipment remains in dormant mode, it may continue idle mode functions but may lengthen the cycle for channel monitoring (e.g. DRX cycle) to reduce battery consumption.

Hereinafter, for ease of description of embodiments, dormant mode may indicate skipping of idle mode operations as a base case and may further indicate lengthening of the channel monitoring cycle to reduce battery consumption as an important subject matter.

There are many situations in which the user equipment may enter dormant mode. For example, to minimize battery consumption as remaining battery power falls below a preset threshold; no data transmission and reception to and from the network is expected for a long time; and a user command to enter dormant mode is issued according to user settings. Alternatively, the network operator may configure the user equipment to operate in battery saving mode through OMA-DM or the like. Without being limited thereto, any circumstance that may be recognized as a necessity for minimizing battery consumption can be used as a reference to determine whether to cause the user equipment to enter dormant mode.

Figure 2:
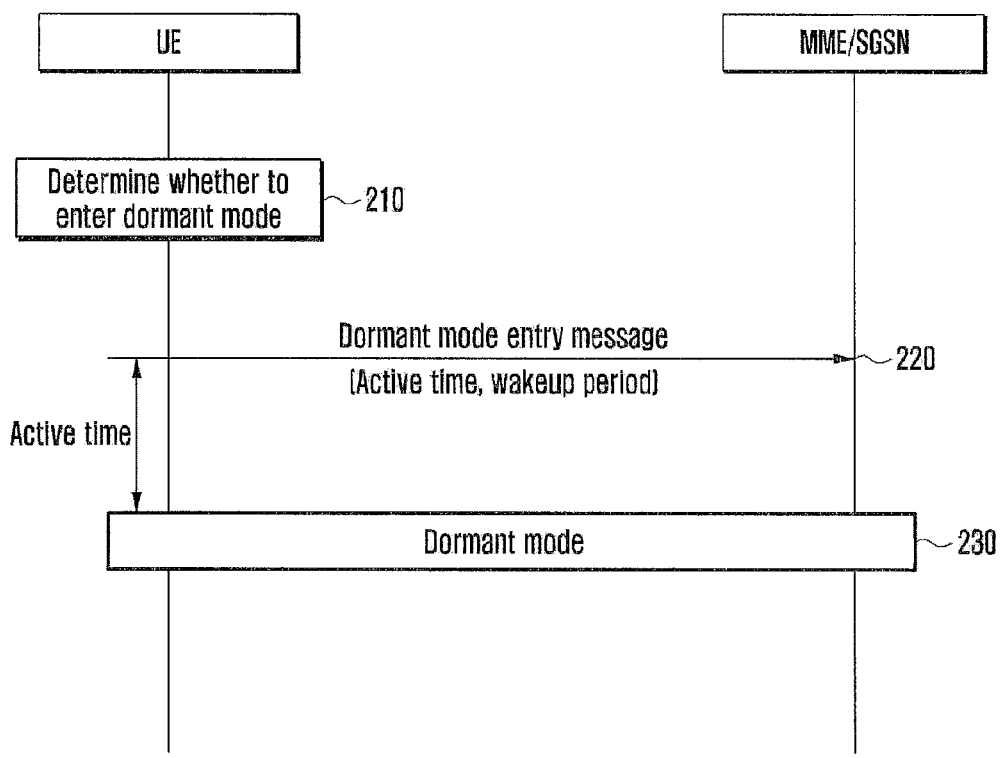
FIG. 2 illustrates a procedure whereby a user equipment enters dormant mode according to an embodiment of the present invention.

FIG. 2 illustrates a procedure whereby a user equipment enters dormant mode according to an embodiment of the present invention.

Referring to FIG. 2, at step 210, the UE determines whether to enter dormant mode. The UE may determine to enter dormant mode because of one of the reasons described above.

Upon determining to enter dormant mode, at step 220, the UE sends a dormant mode entry message to a core network node (MME/SGSN). Here, the dormant mode entry message may be a TAU/RAU request message or a newly defined message. The dormant mode entry message may contain time information for dormant mode.

Specifically, before entering dormant mode, the UE may notify the network of dormant mode information such as active time (remaining time to enter dormant mode) and wakeup period or periodic TAU/RAU timer (time to transition from dormant mode to idle or connected mode).

For example, the UE may notify the network that the UE will enter dormant mode in five minutes and transition back to idle mode after two hours. Then, the network may be aware that it can send accumulated data to the UE first before the UE enters dormant mode, discontinue sending paging messages for two hours from initiation of dormant mode, and send data to the UE in idle mode after transitioning from dormant mode (two hours later).

Upon expiration of the active time after sending dormant mode entry message, at step 230, the UE enters dormant mode.

Meanwhile, as the dormant mode or battery saving function described above is new to the UE, the UE and network need to exchange information regarding availability of dormant mode to determine possibility of using this function. Such information may be exchanged between the UE and network before the UE determines whether to enter dormant mode or enters dormant mode.

Figure 3:
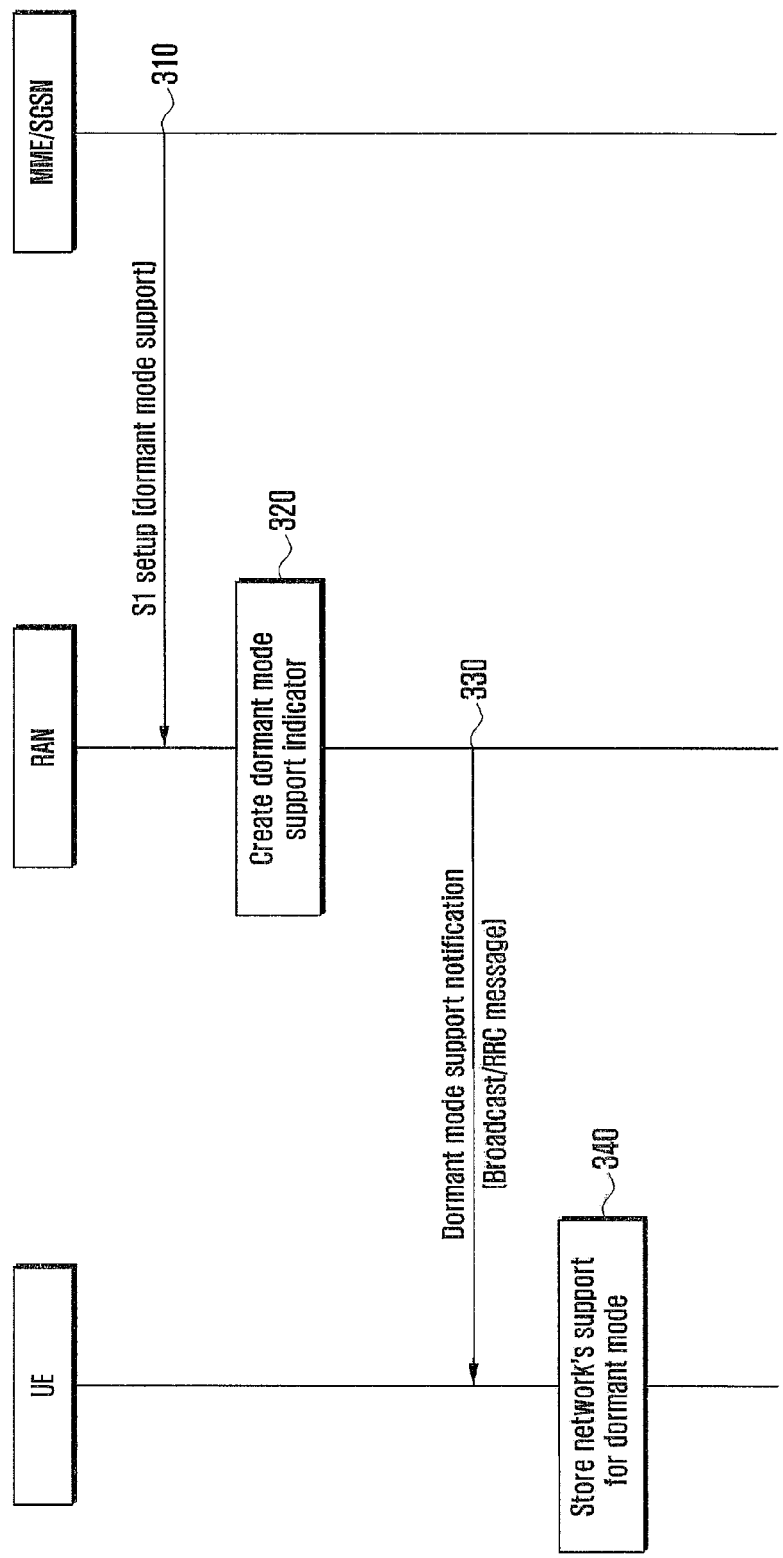
FIG. 3 illustrates a first embodiment of a procedure to exchange information on dormant mode supportability between a user equipment and network.

FIG. 3 illustrates a first embodiment of a procedure to exchange information on dormant mode supportability between a user equipment and network.

Referring to FIG. 3, at step 310, the core network node (e.g. MME or SGSN) notifies the base station (e.g. ENB, RAN or RNC) of information on network support for dormant mode at the time of S1 connection setup.

At step 320, the base station creates a dormant mode support indicator using the received information or other information. At step 330, the base station sends the dormant mode support indicator to the UE. Here, the dormant mode support indicator may be broadcast to the UE as a portion of SIB or be sent separately to the UE through an RRC message.

At step 340, the UE stores the received information on network support for dormant mode. Later, the UE may use this stored information to determine whether to enter dormant mode.

Figure 4:
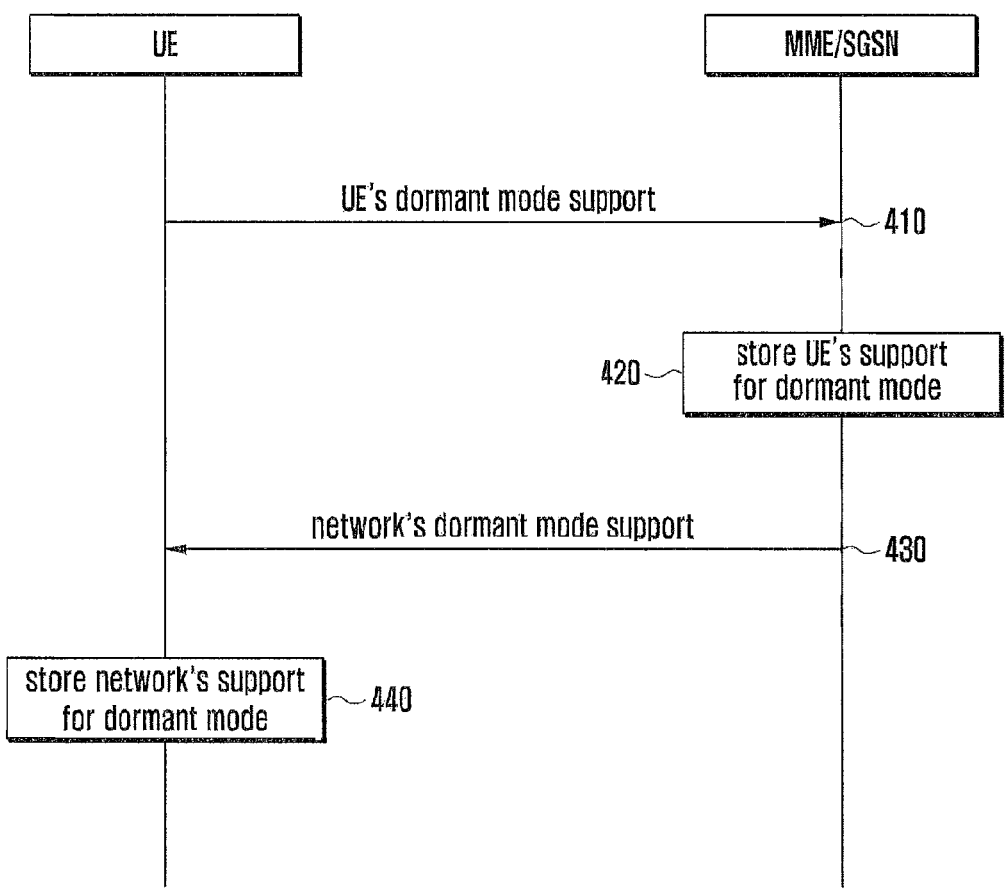
FIG. 4 illustrates a second embodiment of a procedure to exchange information on dormant mode supportability between a user equipment and network.

FIG. 4 illustrates a second embodiment of a procedure to exchange information on dormant mode supportability between the user equipment and network. In FIG. 4, the user equipment and core network notify each other of support for battery saving functionality in the middle of communication.

Referring to FIG. 4, at step 410, the UE sends an attach, TAU or RAU request message containing information on dormant mode support to the network. At step 420, the core network node (MME/SGSN) stores the received information on dormant mode support as a portion of UE information.

If the network supports dormant mode functionality, at step 430, the core network node sends an attach, TAU or RAU response message containing information on dormant mode support to the UE. At step 440, the UE stores the received information on network dormant mode support. The information on dormant mode support may be exchanged between the UE and network by use of a separate message other than the attach, TAU or RAU message.

After entering battery saving mode through the procedure described in FIG. 2, the user equipment is unable to receive downlink data from the network as the communication module is turned off. Hence, the network does not have to page the user equipment to notify generation of downlink data. Next, a description is given of embodiments of a procedure whereby the network suspends data or message transmission to the user equipment.

Figure 5:
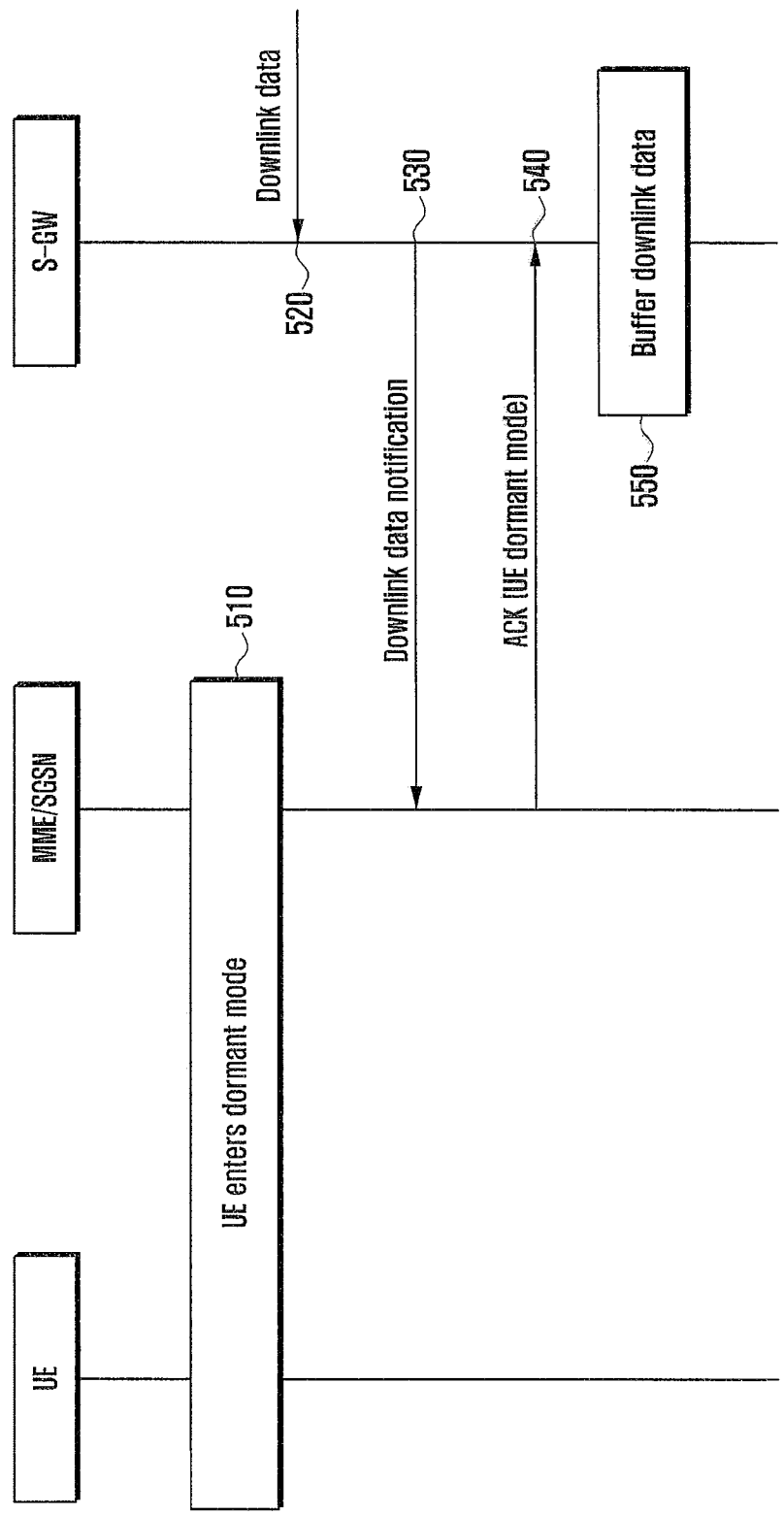
FIG. 5 illustrates a first embodiment of a procedure whereby the network suspends downlink data transmission for a user equipment.

FIG. 5 illustrates a first embodiment of a procedure whereby the network suspends downlink data transmission for a user equipment.

Referring to FIG. 5, at step 510, the UE enters dormant mode and this is notified to the core network node (MME/SGSN).

At step 520, the S-GW receives downlink data for the UE from the P-GW. At step 530, the S-GW sends a downlink data notification (DDN) to the MME.

Currently, as the MME is aware that the UE is in dormant mode, the MME cannot send paging to the UE and does not have to receive downlink data from the S-GW. Hence, upon DDN reception for the UE remaining in dormant mode from the S-GW, at step 540, the MME sends a notification message indicating suspension of data transmission to the S-GW in consideration of the remaining dormant mode time of the UE. Specifically, the MME may send a DDN ACK message containing a UE dormant mode indicator and a timer indicating the dormant mode remaining time to the S-GW.

Upon reception of a DDN ACK message containing a timer, at step 550, the S-GW stores the downlink data in a buffer until the timer expires without sending the downlink data to the MME. Upon reception of a DDN ACK message not containing a timer, at step 550, the S-GW does not send the downlink data for the UE until a notification message indicating resumption of data transmission is received from the MME.

Figure 6:
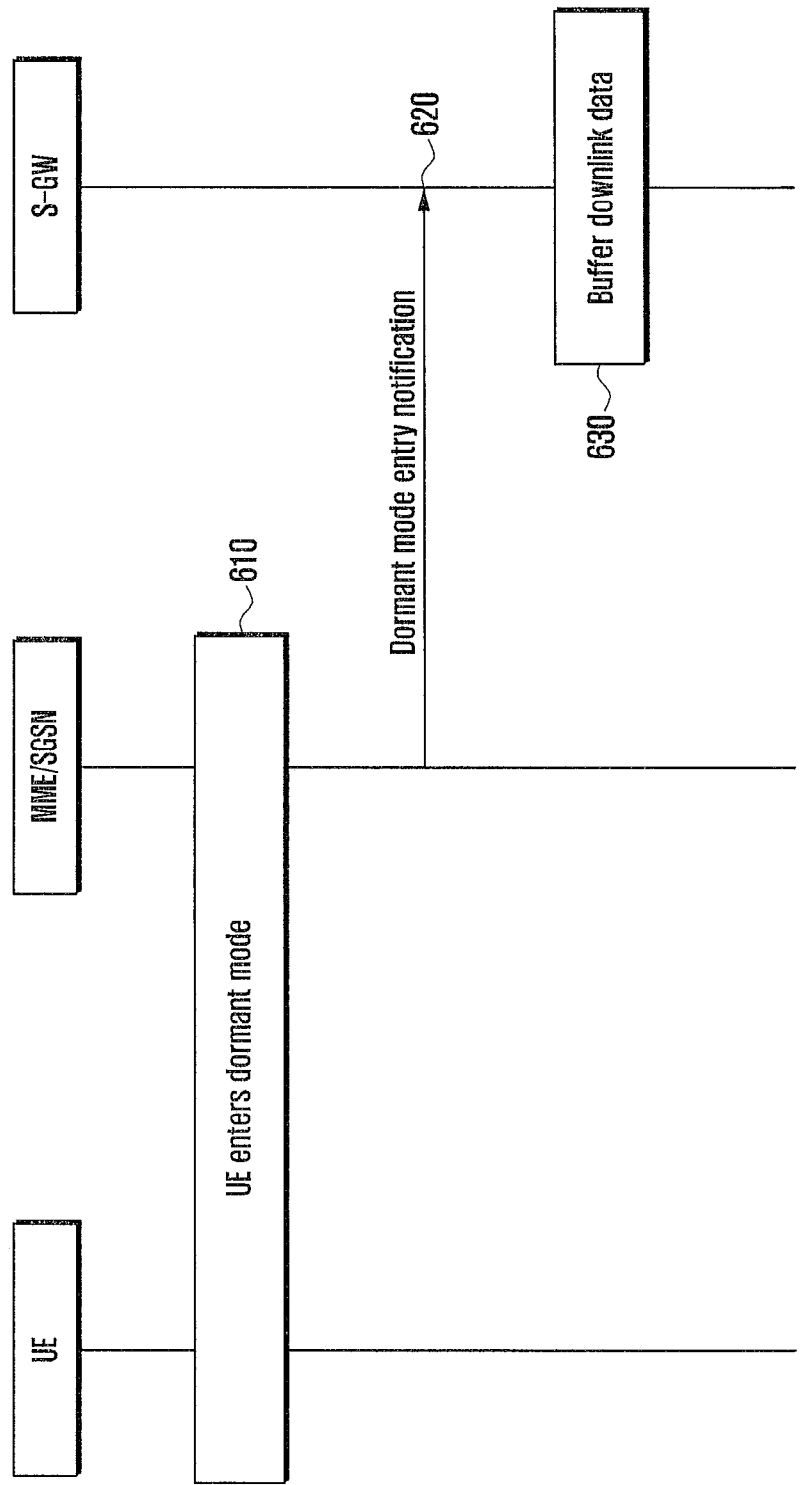
FIG. 6 illustrates a second embodiment of a procedure whereby the network suspends downlink data transmission for a user equipment.

FIG. 6 illustrates a second embodiment of a procedure whereby the network suspends downlink data transmission for a user equipment.

Referring to FIG. 6, at step 610, the UE enters dormant mode. At step 620, the core network node (MME/SGSN) immediately sends a Delay Downlink Packet Notification Request (as a UE dormant mode notification) to the S-GW.

The Delay Downlink Packet Notification Request sent by the MME to the S-GW may further contain an inactivity timer indicating the UE dormant mode remaining time.

Upon reception of the Delay Downlink Packet Notification Request from the MME, the S-GW is aware that the UE is in battery saving mode. At step 630, the S-GW stores downlink data for the UE in a buffer and does not send DDN for the UE until the timer contained in the Delay Downlink Packet Notification Request expires (if timer present) or a notification message indicating resumption of data transmission is received from the MME (if timer absent).

Figure 7:
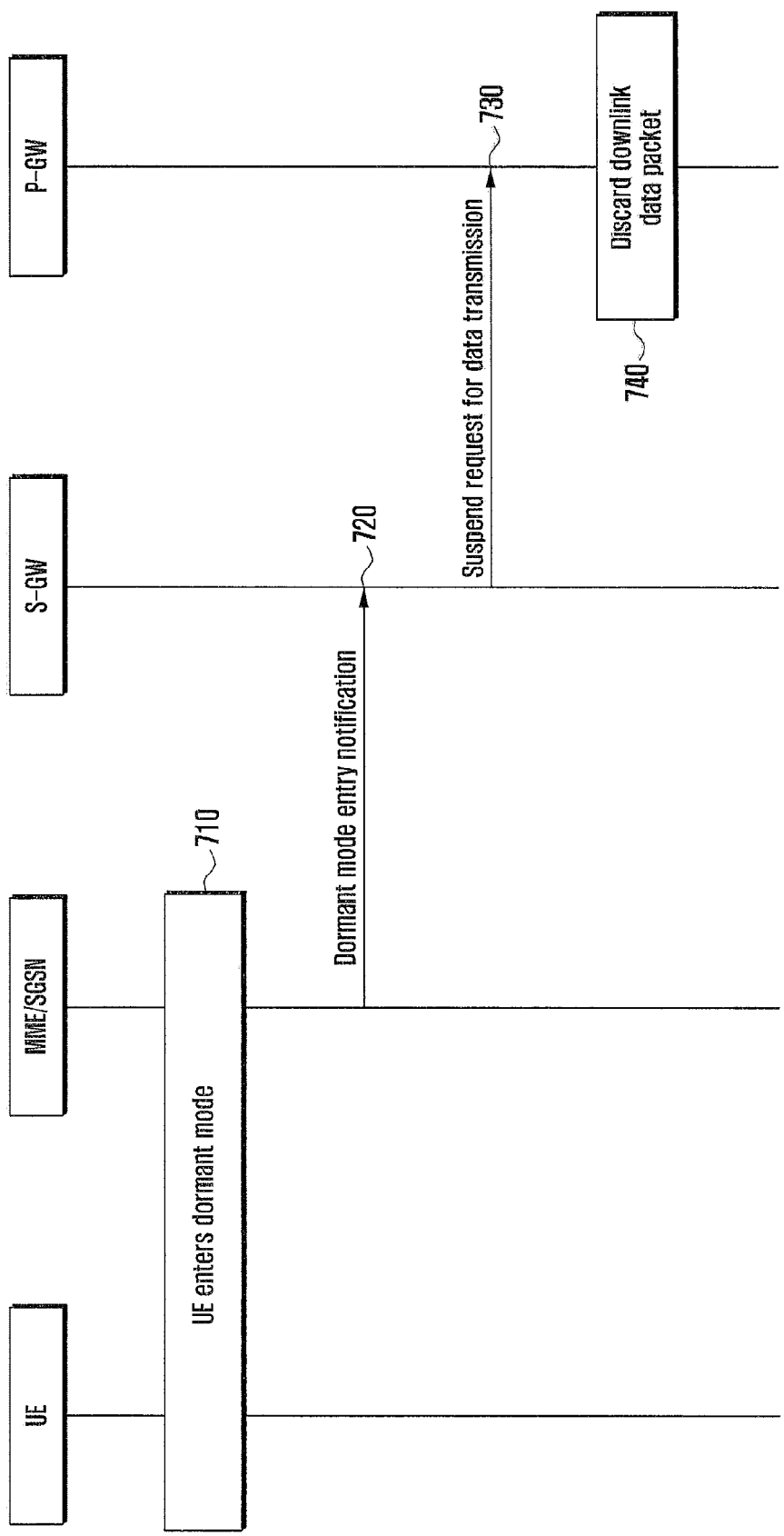
FIG. 7 illustrates a third embodiment of a procedure whereby the network suspends downlink data transmission for a user equipment.

FIG. 7 illustrates a third embodiment of a procedure whereby the network suspends downlink data transmission for a user equipment.

Referring to FIG. 7, at step 710, the UE enters dormant mode. At step 720, the core network node (MME/SGSN) sends a suspend request message to the S-GW to notify UE dormant mode. Here, the suspend request message may contain a cause for suspending downlink data transmission for the UE, and may further contain an inactivity timer indicating the UE dormant mode remaining time.

Upon reception of the suspend request message from the MME, at step 730, the S-GW sends a suspend request message indicating discard of downlink data packets for the UE to the P-GW. Here, the suspend request message sent by the S-GW to the P-GW may contain a suspension cause indicating UE battery saving, and further contain an inactivity timer indicating the UE dormant mode remaining time.

Upon reception of the suspend request message from the S-GW, the P-GW is aware that the UE remains in dormant mode. At step 740, the P-GW discards downlink data packets addressed to the UE and does not send the same until the inactivity timer contained in the message expires (if inactivity timer present) or a notification message indicating end of dormant mode is received from the S-GW (if inactivity timer absent).

When the user equipment exits from dormant mode temporarily or semi-permanently (i.e. dormant mode is ended), it may send a dormant mode exit message containing an end-of-dormant-mode indicator to the network. That is, while the network is able to predict the dormant mode end time for the UE on the basis of wakeup period information contained in the dormant mode entry message sent by the UE, the UE may directly notify the network of dormant mode termination.

Figure 8:
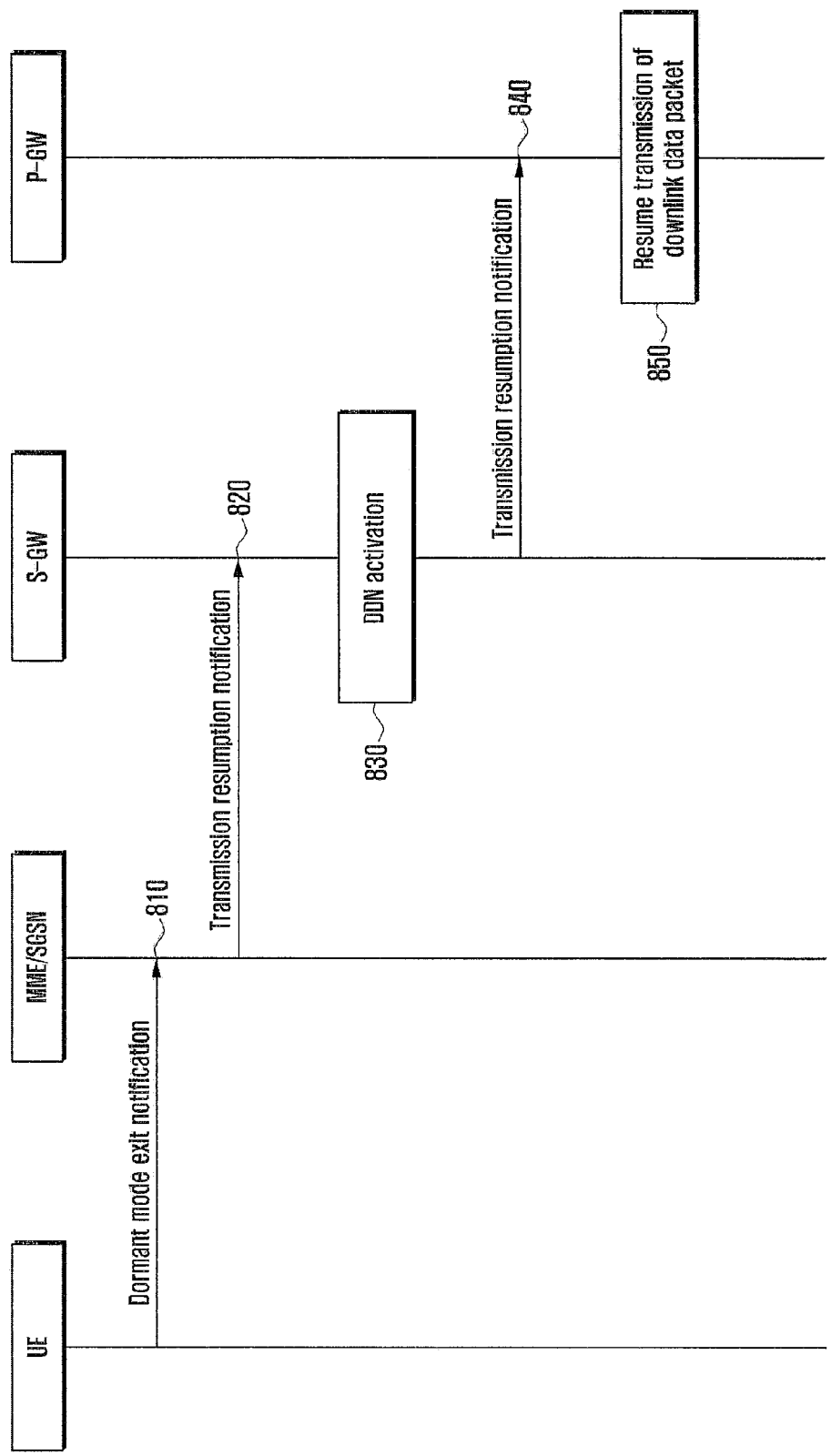
FIG. 8 illustrates operations performed after a user equipment terminates dormant mode.

FIG. 8 illustrates operations performed after a user equipment exits from dormant mode.

Referring to FIG. 8, at step 810, the UE sends an attach, TAU, RAU or service request containing an end-of-dormant-mode indicator as a dormant mode termination message to the network. Here, another existing message or a newly defined message may be used at step 810.

The dormant mode termination message may contain information regarding at least one of active time (the time remaining to the next dormant mode start time) and wakeup period (dormant mode duration).

Upon reception of the dormant mode termination message from the UE, at step 820, the MME sends a transmission resumption notification message containing a UE dormant mode termination indicator to the S-GW. Here, the transmission resumption notification message may further contain information regarding at least one of active time (the time remaining to the next dormant mode start time) and wakeup period (dormant mode duration).

At step 830, the S-GW activates DDN and sends DDN to the MME upon generation of downlink data addressed to the UE until the timer for the active time expires (if active time is contained in the transmission resumption notification message) or a separate message indicating UE dormant mode entry is received (otherwise).

When dormant mode is terminated in a state wherein the MME has suspended resources (e.g. bearers) of the UE remaining in dormant mode as described in FIG. 7, at step 820, the MME sends a transmission resumption notification to the S-GW.

At step 840, the S-GW notifies the P-GW of data transmission resumption, so that downlink data transmission is resumed. Here, the data transmission resumption notification from the S-GW to the P-GW may contain information regarding at least one of UE active time (the time remaining to the next dormant mode start time) and wakeup period (dormant mode duration).

At step 850, the P-GW delivers downlink data addressed to the UE until the timer for the active time expires (if active time is contained in the received message) or a message indicating UE dormant mode entry is received (otherwise).

As described above, when a message indicating UE dormant mode termination contains information on UE active time (the time remaining to the next dormant mode start time), the UE may reenter dormant mode upon expiration of the active time and core network nodes having received the message (MME/SGSN, S-GW and P-GW) may be implicitly aware that the UE remains in dormant mode.

Meanwhile, when switching of the core network node at which the UE is registered is needed owing to movement of the UE in dormant mode or after dormant mode termination, the old core network node may send dormant mode parameters for the UE to the new core network node.

Figure 9:
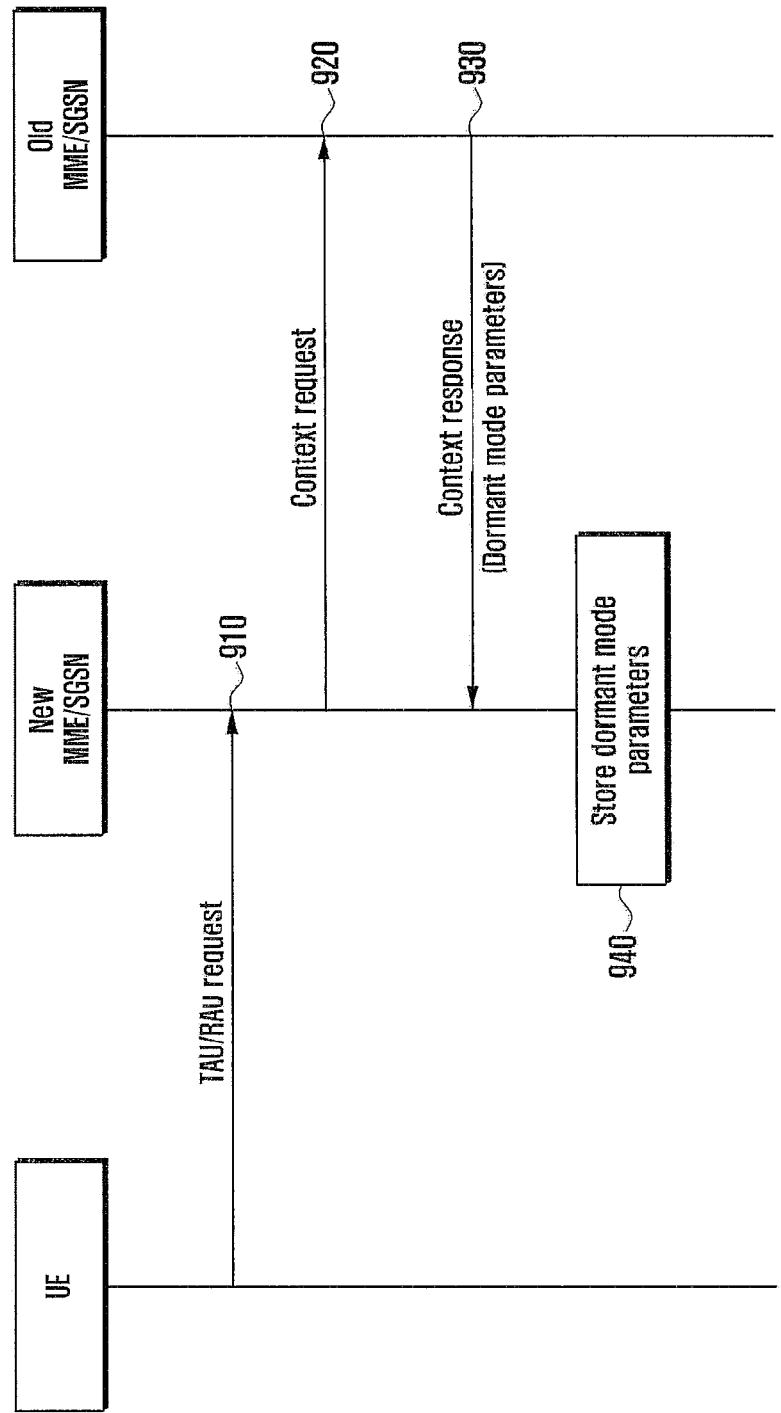
FIG. 9 illustrates switching between core network nodes according to movement of a user equipment.

FIG. 9 illustrates switching between core network nodes according to movement of a user equipment.

Referring to FIG. 9, at step 910, the UE sends a TAU/RAU request message to the new core network node (new MME/SGSN). When the UE is moved during dormant mode, the TAU or RAU request message is sent after dormant mode termination.

At step 920, the new MME/SGSN sends a Context request message to the old core network node (old MME/SGSN) at which the UE was registered. At step 930, the old MME/SGSN sends a Context response message containing UE dormant mode parameters to the new MME/SGSN.

The dormant mode parameters of a UE may include not only a dormant mode support indicator but also at least one of activity timer and wakeup period having sent by the UE to the core network node.

At step 940, the new core network node (new MME/SGSN) stores the received UE dormant mode parameters, which may be used later to manage UE dormant mode.

In addition, when Idle Mode Signaling Reduction (ISR) is active for the UE, UE contexts are registered at both the MME and the SGSN and the UE may move between the MME and SGSN without location registration as shown in FIG. 9.

When the UE enters dormant mode, the serving core network node (MME or SGSN) sends an indicator to UE dormant mode entry to the target core network node (SGSN or MME). Additionally, the UE may notify at least one of dormant mode duration (wakeup period) and the time remaining to the next dormant mode start time (active time). The target core network node stores these values, which are used later to handle downlink data.

Meanwhile, in the event that a user equipment uses SMS delivery through circuit-switched fallback (CSFB) or a SGs connection, paging for a CS domain service may be generated although the user equipment in dormant mode cannot receive such paging.

Figure 10:
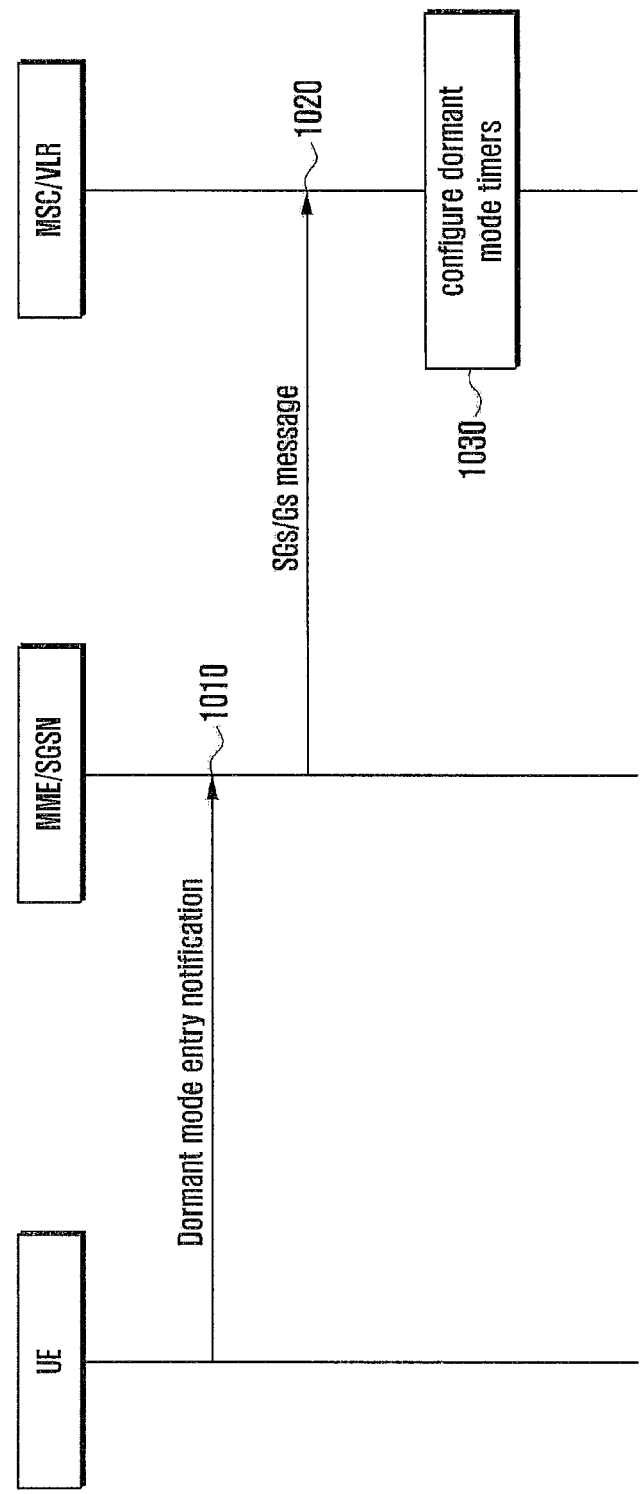
FIG. 10 illustrates a case in which a user equipment utilizes SMS delivery through Circuit-Switched fallback (CSFB) or a SGs connection.

FIG. 10 illustrates a case in which a user equipment utilizes SMS delivery through CSFB or a SGs connection.

Referring to FIG. 10, at step 1010, the UE utilizing SMS delivery through CSFB or a SGs connection enters dormant mode and notifies this to the MME through a TAU/RAU request message. At step 1020, the MME sends an indicator to UE dormant mode entry to the MSC/VLR through the SGs interface.

Here, the message sent by the MME to the MSC/VLR may further contain at least one of active time (the time remaining to the next dormant mode start time) and wakeup period (dormant mode duration) received from the UE.

At step 1030, the MSC/VLR configures dormant mode timers (i.e. timers for active time and wakeup period). Here, when information to be sent to the UE is present, the MSC/VLR may attempt to send the information before expiration of activity time; and the MSC/VLR does not attempt to send data to the UE during wakeup period after expiration of activity time by assuming that the UE is in dormant mode. When the UE exits from dormant mode, the MME sends an indicator to this to the MSC/VLR.

When the user equipment performs dormant mode operation in a network operating in Network Mode of Operation I (NMO I), the SGSN (instead of the MME) may play a leading role using Gs (instead of SGs) in the procedures described above.

The network system may obtain state information through user equipments. That is, user equipments may measure channel states, identify shadow areas or collect neighbor system information, and report these information to the network. Minimization of Drive Tests (MDT) is such an example. If a user equipment enters dormant mode (namely, skipping idle mode operations or lengthening the channel monitoring cycle to reduce battery consumption), the user equipment does not perform measurements. Hence, the node of the network system managing UE-based measurements (e.g. ENB) has to know that a particular UE has entered dormant mode (battery saving mode).

To this end, as a first embodiment, when the UE determines to enter dormant mode, the UE notifies the ENB of this by sending a dormant mode notification message in the form of an RRC message. The dormant mode notification message sent to the ENB may contain a dormant mode indicator indicating UE dormant mode entry, and may further contains an activity timer indicating the time remaining to the dormant mode start time and a wakeup period timer indicating the next wakeup time.

Figure 11:
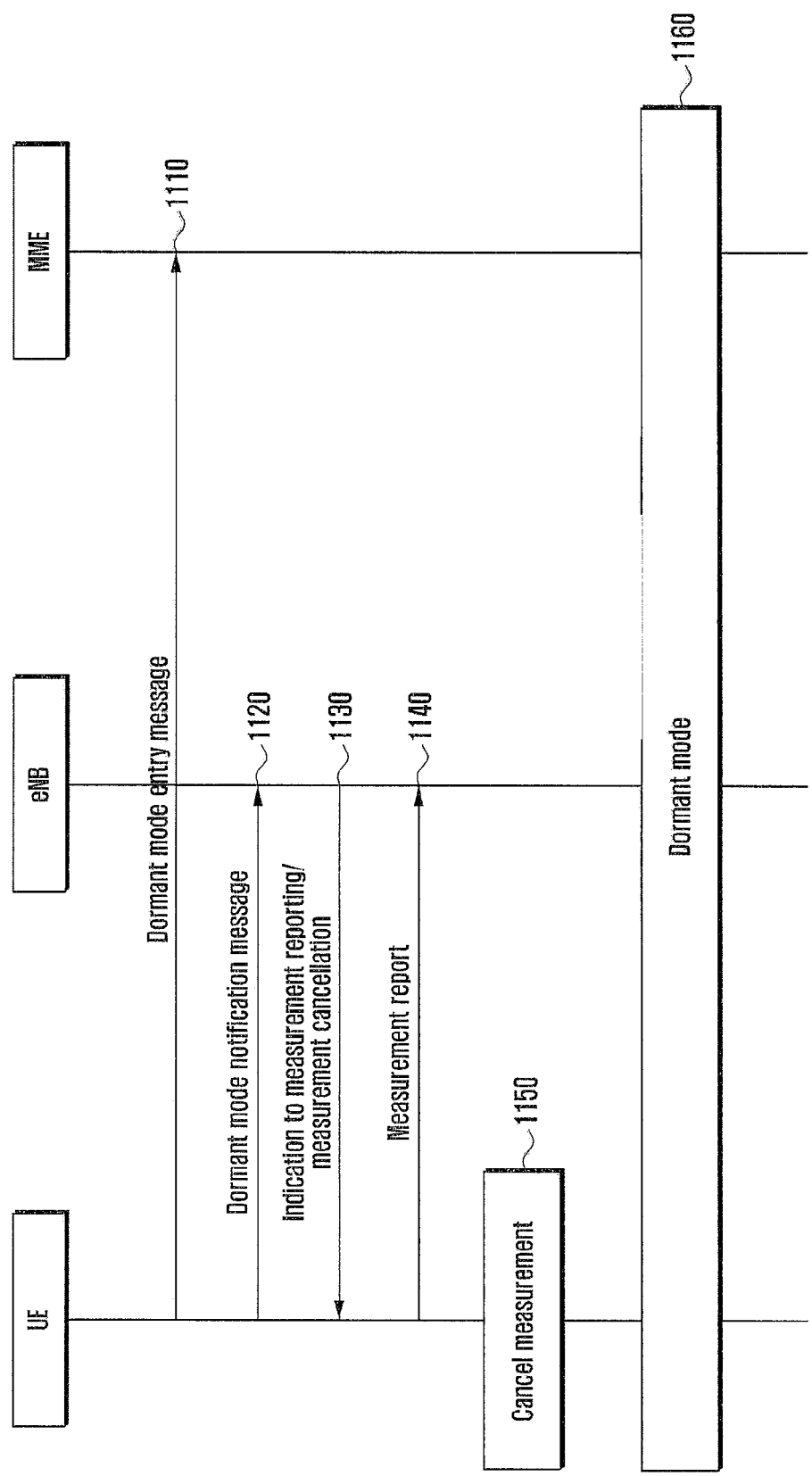
FIG. 11 illustrates a first embodiment of a procedure to notify the base station that the user equipment capable of measurement reporting enters dormant mode.

FIG. 11 illustrates a first embodiment of a procedure to notify the ENB that the UE capable of measurement reporting enters dormant mode.

Referring to FIG. 11, at step 1110, the UE notifies the MME of dormant mode entry by sending a dormant mode entry message to the MME. At step 1120, the UE sends a dormant mode notification message to the ENB. The dormant mode notification message may be sent at the same time as transmission of the dormant mode entry message or may be sent after transmission of the dormant mode entry message and before entering dormant mode at step 1160.

As a second embodiment of dormant mode entry notification, when the UE determines to enter battery saving mode through interaction between the UE and MME, the MME notifies the ENB of UE dormant mode entry by sending a dormant mode notification message such as S1-AP message. Like a dormant mode notification message sent by the UE to the ENB, the dormant mode notification message sent by the MME to the ENB may contain a dormant mode indicator, an activity timer indicating the time remaining to the dormant mode start time, and a wakeup period timer indicating the next wakeup time.

Alternatively, when the MME becomes aware that the UE supporting a measurement function such as MDT has entered dormant mode, the MME may notify the ENB that the UE cannot perform the measurement function such as MDT by use of an S1-AP message (Initial Context Setup Request or Context Modification Request). For example, the MME may send an S1-AP message whose MDT flag is set to "false".

Figure 12:
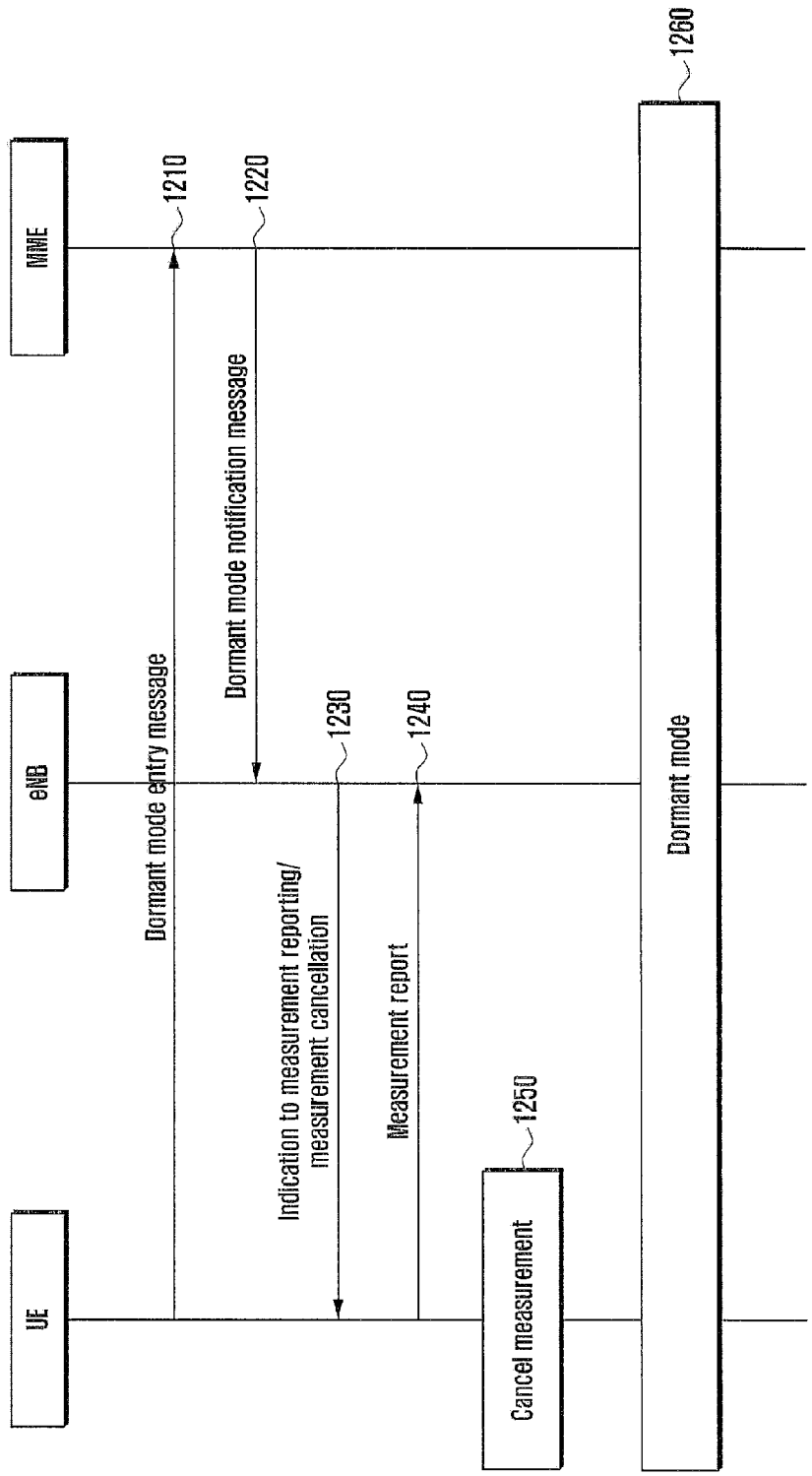
FIG. 12 illustrates a second embodiment of a procedure to notify the base station that the user equipment capable of measurement reporting has enters dormant mode.

FIG. 12 illustrates a second embodiment of a procedure to notify the ENB that the UE capable of measurement reporting enters dormant mode.

Referring to FIG. 12, at step 1210, the UE notifies the MME of dormant mode entry by sending a dormant mode entry message to the MME. At step 1220, the MME notifies the ENB of UE measurement discontinuation by sending a dormant mode notification message to the ENB. The dormant mode notification message may be sent by the MME immediately after reception of the dormant mode entry message from the UE or may be sent after reception of the dormant mode entry message and before UE entering dormant mode at step 1260.

When it is known to the ENB that the UE performing measurement will soon enter battery saving mode, the ENB may direct the UE to immediately report logged measurement information. This is to reduce the difference between the time of measurement and the time of measurement data collection. The ENB may issue a command to report measurement results at step 1130 of FIG. 11 or at step 1230 of FIG. 12. In response to the command, the UE may immediately send currently accumulated measurement information to the ENB at step 1140 of FIG. 11 or at step 1240 of FIG. 12.

When a measurement configuration for MDT operation is set in the UE, the ENB may send an indication to cancelling of such measurement configuration to the UE so that the UE discontinues measurement operation. The ENB may issue a command to cancel measurement at step 1130 of FIG. 11 or at step 1230 of FIG. 12. In response to the command, the UE cancels measurement at step 1150 of FIG. 11 or at step 1250 of FIG. 12 and discontinues measurement reporting.

When the UE enters battery saving mode, channel monitoring or measurement is not performed. Hence, the MME or ENB notifies this to the Element Manager (EM) acting as a measurement log server. This dormant mode notification message sent to the EM may contain a dormant mode indicator for the UE, an activity timer indicating the time remaining to the dormant mode start time, and a wakeup period timer indicating the next wakeup time.

Figure 13:
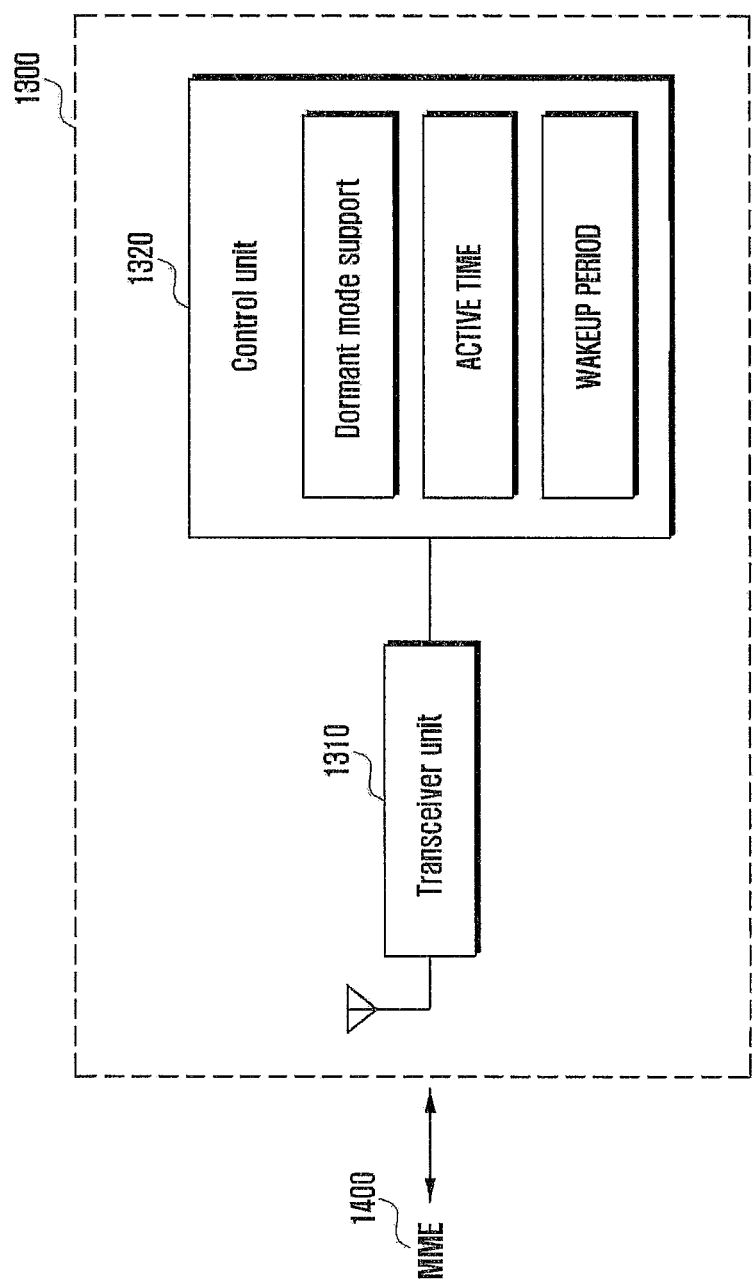
FIG. 13 illustrates a configuration of a user equipment according to the present invention.

FIG. 13 illustrates a configuration of a user equipment according to the present invention. Referring to FIG. 13, the user equipment 1300 may include a transceiver unit 1310 and a control unit 1320.

The transceiver unit 1310 communicates with the network through wireless channels, and sends and receives messages to and from the MME 1400 in particular. The messages sent to and received from the MME 1400 may include a message indicating entry into dormant mode, a message indicating exit from dormant mode, a message indicating supportability of dormant mode, and a message indicating resumption of data transmission after exit from dormant mode.

The control unit 1320 generates messages to be communicated with the MME 1400 according to embodiments of the present invention, and manages information regarding dormant mode supportability of the UE 1300 and network, and UE dormant mode times (active time and wakeup period). Dormant mode parameters may be separately stored. Dormant mode operation of the UE 1300 performed under control of the control unit 1320 is depicted in various embodiments described before.

Figure 14:
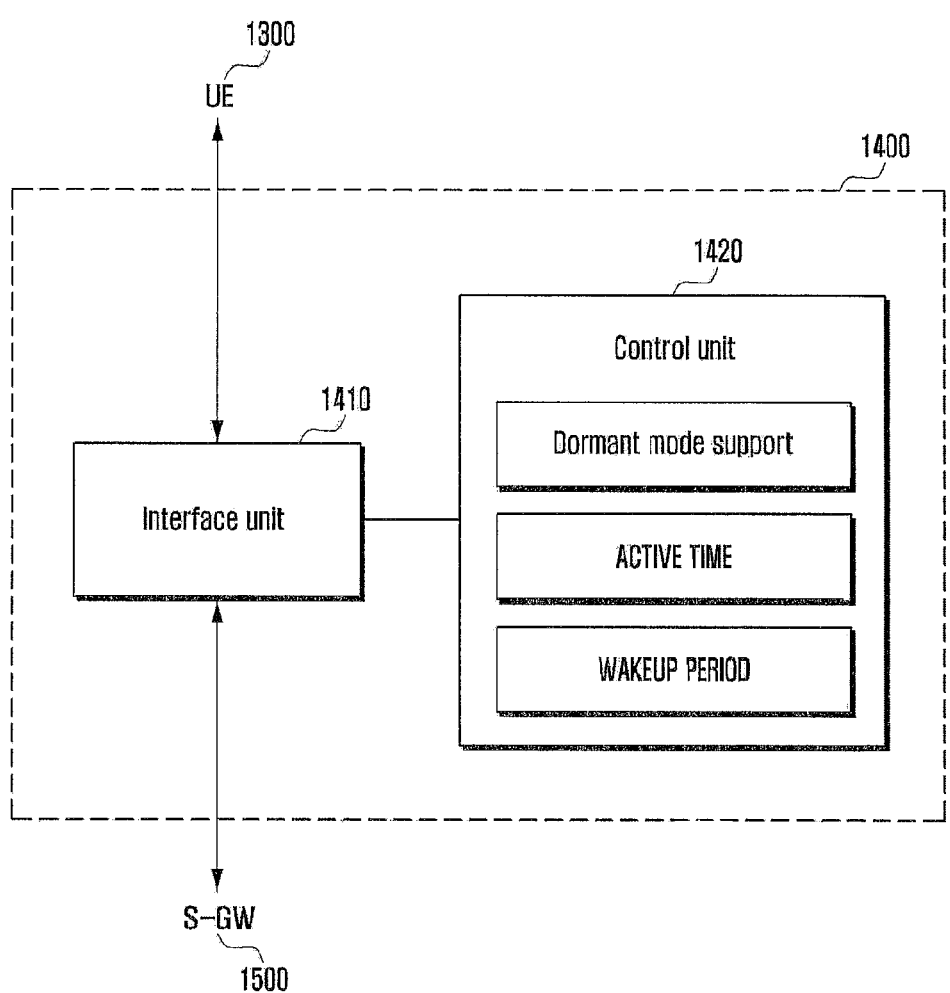
FIG. 14 illustrates a configuration of a network node (specifically, MME) according to the present invention.

FIG. 14 illustrates a configuration of a network node (specifically, MME 1400) according to the present invention. Referring to FIG. 14, the MME 1400 may include an interface unit 1410 and a control unit 1420.

The interface unit 1410 sends and receives messages to and from the UE 1300 and S-GW 1500. The messages sent to and received may include a message indicating entry into dormant mode of the UE 1300, a message indicating exit from dormant mode, a message indicating supportability of dormant mode for the UE 1300, and a message indicating downlink data transmission after exit from dormant mode.

The control unit 1420 controls operations of the MME 1400 in relation to dormant mode of the UE 1300 according to embodiments of the present invention, and manages information regarding dormant mode supportability, and dormant mode times (active time and wakeup period) received from the UE 1300. Dormant mode parameters may be separately stored.

Figure 15:
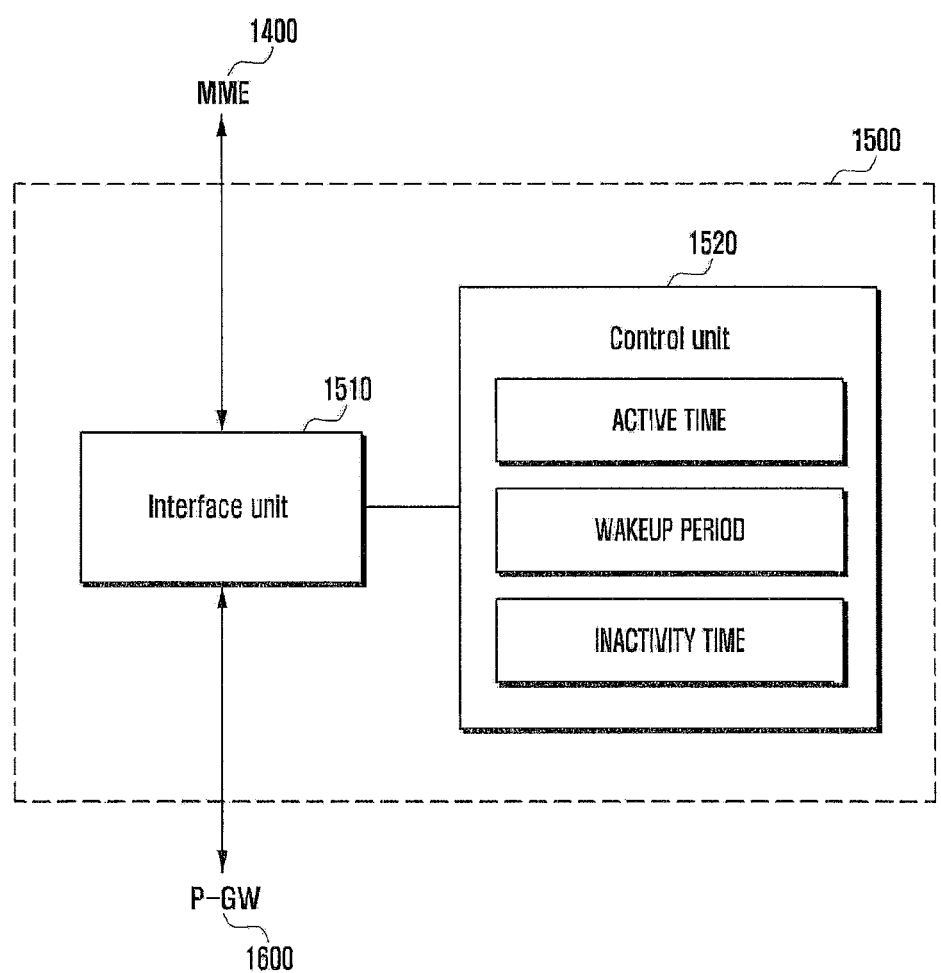
FIG. 15 illustrates a configuration of a network node (specifically, S-GW) according to the present invention.

FIG. 15 illustrates a configuration of a network node (specifically, S-GW 1500) according to the present invention. Referring to FIG. 15, the S-GW 1500 may include an interface unit 1510 and a control unit 1520.

The interface unit 1510 sends and receives messages to and from the MME 1400 and P-GW 1600. The messages sent to and received in relation to the present invention may include a message indicating suspension of data transmission due to entry into dormant mode of the UE 1300, and a message indicating resumption of data transmission due to exit from dormant mode.

The control unit 1520 controls operations of the S-GW 1500 and message exchange through the interface unit 1510 in relation to dormant mode of the UE 1300 according to embodiments of the present invention. Specifically, the control unit 1520 manages dormant mode time information (active time, wakeup period and inactivity time) to suspend or resume data transmission for the UE 1300.

Meanwhile, it is necessary to handle PS bearers when the UE is switched from the LTE network (E-UTRAN) to a 2G or 3G network (UTRAN/GERAN) during CSFB. In the event that the UE cannot use PS bearers and a CS voice call at the same time in the RAN after switching (e.g. in GERAN not supporting DTM), as the UE cannot send or receive PS data, it is necessary to discard packets going from the gateway to the UE by suspending PS bearers.

A problem arises when the cell to which the US is commanded by the system to move is different from the cell actually selected by the UE. For example, although the system has commanded the UE to move to a GERAN cell not supporting DTM, if the UE selects a GERAN or UTRAN cell supporting DTM by reason of channel states or the like, the system may determine to suspend PS bearers because of impossibility of PS data transfer, but in reality the UE may use PS bearers and CS voice call at the same time.

During CSFB, when the ENB selects a GERAN cell not supporting DTM, it sends the MME a S1-release request containing an indication to this. Upon reception of such indication, the MME suspends and preserves PS bearers. Here, if the UE autonomously selects a UTRAN or GERAN cell supporting DTM, the problem described above arises.

That is, as the MME does not know the cell actually selected by the UE, the MME may unnecessarily suspend PS bearers.

As described above, although the system has issued a command to move to a GERAN cell not supporting DTM, if the UE actually selects a UTRAN or GERAN cell supporting DTM, it is necessary to provide a scheme permitting continuous use of PS bearers.

Figure 16:
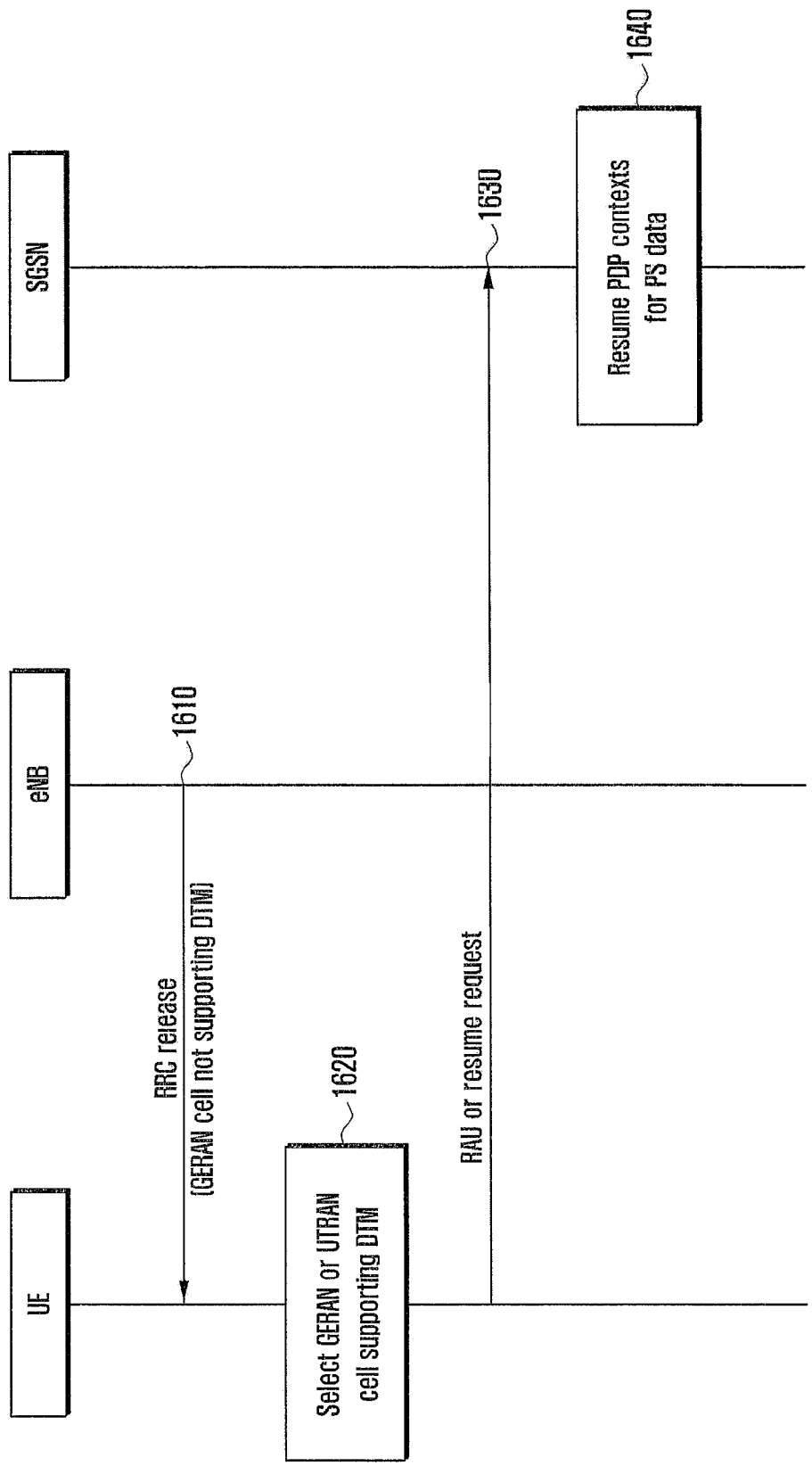
FIG. 16 depicts a first embodiment of a procedure to handle PS bearers for a user equipment involved in CSFB.

FIG. 16 depicts a first embodiment of a procedure to handle PS bearers for a user equipment involved in CSFB. In the first embodiment of FIG. 16, when the cell to which the UE is commanded by the network to move is different from the cell actually selected by the UE, a RAU or Resume procedure is performed to resume the PS PDP context.

Referring to FIG. 16, at step 1610, the UE receives a command to move to a GERAN cell not supporting DTM from the ENB through an RRC release message. At step 1620, the UE selects a GERAN or UTRAN cell supporting DTM different from the commanded cell. At step 1630, the UE sends a RAU or Resume request message to the SGSN as a request for resuming the PDP context. At step 1640, the SGSN resumes the PDP context for PS data.

When the MME suspends PS bearers immediately upon reception of an S1 release request from the ENB, in most cases it is possible to resume the PS bearers according to the embodiment of FIG. 16. On the other hand, when suspension of PS bearers is delayed owing to certain conditions of the MME or core network, it is possible to suspend PS bearers after the RAU or resume request from the UE is processed. In this case, the UE may still be unable to use PS data although the RAU or resume request is processed. To prevent this, the UE may delay the RAU or Resume procedure for a given time, waiting for the MME to complete suspension.

Figure 17:
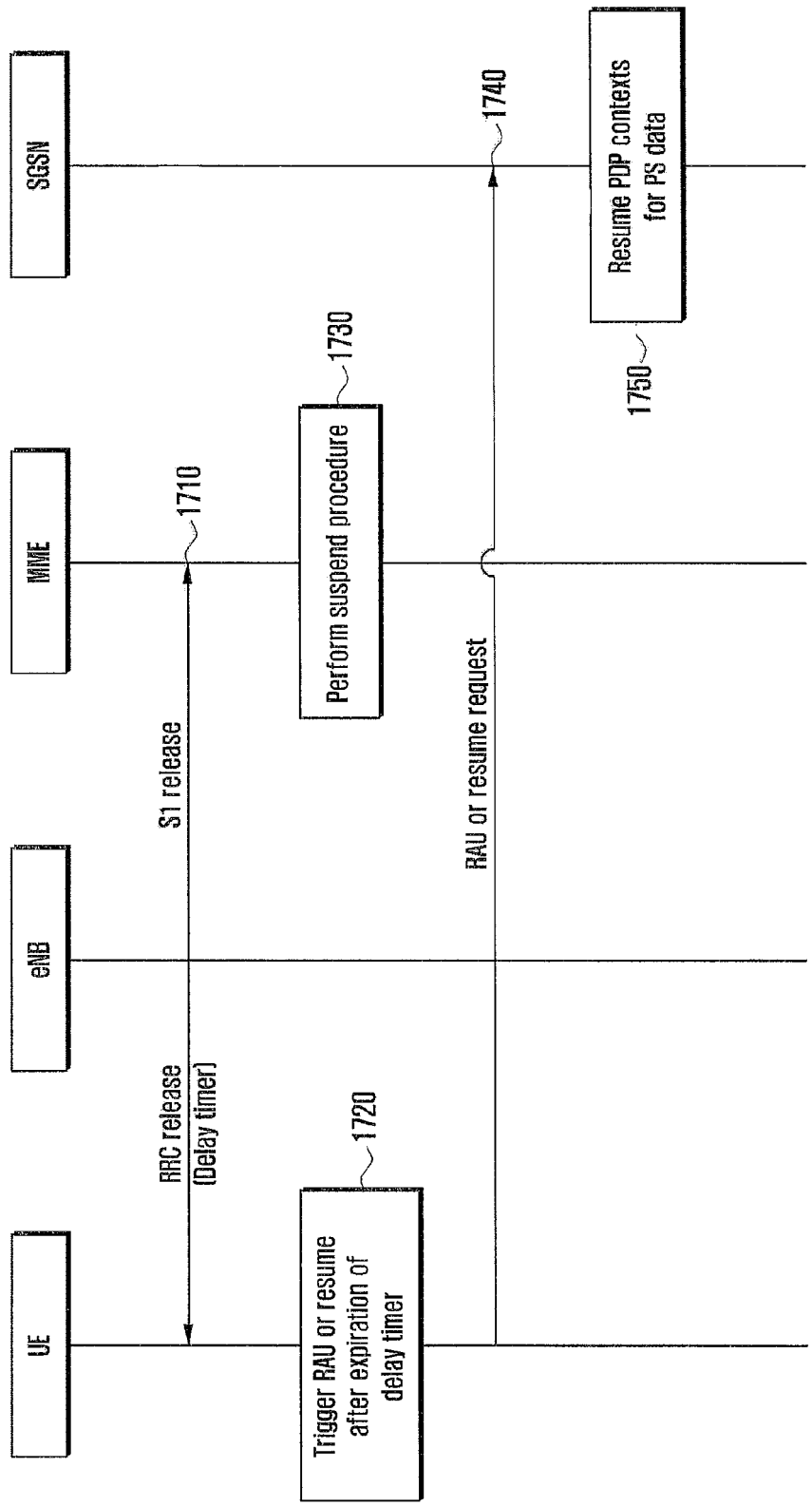
FIG. 17 depicts a second embodiment of a procedure to handle PS bearers for a user equipment involved in CSFB.

FIG. 17 depicts a second embodiment of a procedure to handle PS bearers for a user equipment involved in CSFB.

Referring to FIG. 17, at step 1710, for CSFB, the ENB sends an RRC release message to the UE and sends an S1 release message to the MME. Here, the RRC release message sent to the UE may contain a delay timer to slightly delay the RAU/Resume procedure when the UE is commanded to move to a GERAN cell not supporting DTM. The UE may operate according to the timer value received from the ENB or according to a timer value determined by internal settings.

When the UE selects a UTRAN cell or GERAN cell supporting DTM although having received a command to move to a GERAN cell not supporting DTM from the ENB, at step 1720, the UE starts the delay timer. Upon expiration of the delay timer, at step 1740, the UE sends an RAU or Resume request to the SGSN. While the delay timer is running, the MME performs the suspend procedure as indicated by step 1730.

Thereafter, at step 1750, the SGSN resumes the PDP context for PS data according to the message from the UE.

Figure 18:
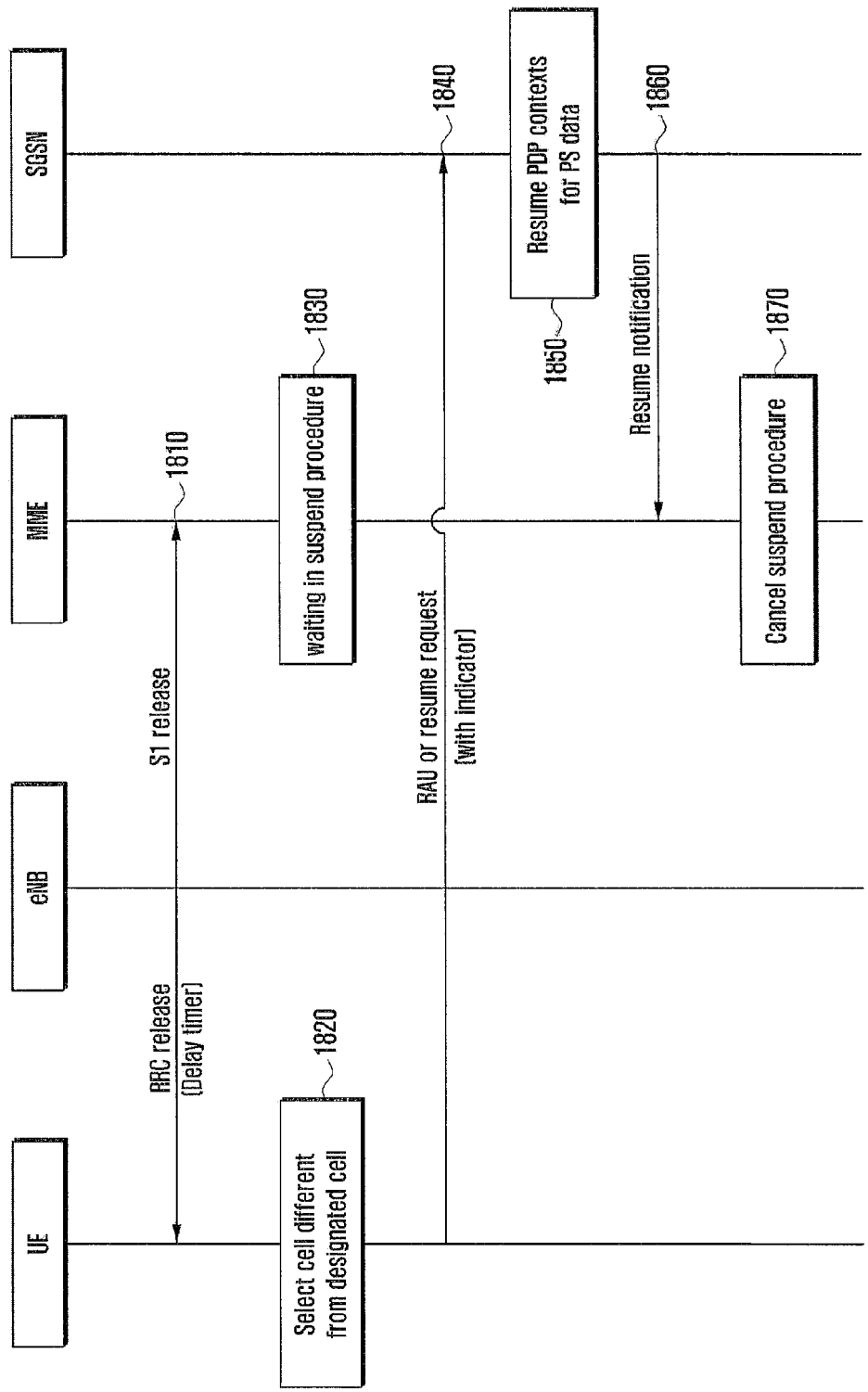
FIG. 18 depicts a third embodiment of a procedure to handle PS bearers for a user equipment involved in CSFB.

FIG. 18 depicts a third embodiment of a procedure to handle PS bearers for a user equipment involved in CSFB. In the third embodiment of FIG. 18, when the SGSN receives an RAU or Resume request from the UE, it notifies the MME that the PS PDP context is resumed and informs the MME to cancel the suspend procedure in wait state if present.

Referring to FIG. 18, at step 1810, the ENB commands the UE to move to a GERAN cell not supporting DTM by sending an RRC release message, and sends an S1 release message to the MME. At step 1820, the UE selects a GERAN or UTRAN cell supporting DTM. At step 1840, the UE sends a RAU or Resume request message to the SGSN.

Here, the RAU or Resume request message sent to the SGSN may contain an indicator indicating that the UE switched to a cell supporting PS data transmission although having received a command to move to a GERAN cell not supporting DTM. At this time, the suspend procedure is in wait state as indicated by step 1830.

At step 1850, the SGSN resumes the PDP context for PS data according to the request message from the UE. At step 1860, the SGSN notifies the MME of resumption of the PDP context. The resume notification sent by the SGSN to the MME may also contain an indicator indicating that the UE switched to a cell supporting PS data transmission although having received a command to move to a GERAN cell not supporting DTM.

Upon reception of the notification indicating resumption of the PDP context for the UE from the SGSN, at step 1870, the MME cancels the suspend procedure in wait state if present.

FIG. 19 depicts a fourth embodiment of a procedure to handle PS bearers for a user equipment involved in CSFB.

Referring to FIG. 19, at step 1910, the UE sends a RAU or Resume request message to the SGSN. At step 1920, the SGSN resumes the PDP context according to the request message from the UE.

At step 1930, the S-GW receives a resume notification for the PDP context from the SGSN or receives a PDP context setup request. At step 1940, the S-GW receives a delete bearer resource message for suspension from the MME. At step 1950, the S-GW maintains PDP contexts set up for UTRAN/GERAN and does not forward the delete bearer resource message to the P-GW. Thereby, the P-GW and S-GW may process generated downlink packets.

The above description with reference to the accompanying drawings is provided to assist in a comprehensive understanding of various embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the present invention.

Hereinabove, embodiments of the present invention have been described with reference to the accompanying drawings. Specific terms or words used in the description should be construed in accordance with the spirit of the present invention without limiting the subject matter thereof. It should be understood that many variations and modifications of the basic inventive concept described herein will still fall within the spirit and scope of the present invention as defined in the appended claims and their equivalents.

The invention claimed is:

1. A method for operating a user equipment (UE), the method comprising:
   receiving a first message indicating capability of a dormant mode of a network from the network;
   determining whether to enter the dormant mode during which data transmission between the UE and the network is suspended; and
   sending, upon determining to enter the dormant mode, a second message including active time information and period information for dormant mode time information to the network.

2. The method of claim 1, further comprising sending a message indicating capability of dormant mode of the UE to the network before receiving the first message from the network.

3. The method of claim 1, further comprising sending, in response to information on results of measurement conducted in idle mode being to be reported to a base station (ENB) of the network, a dormant mode notification message indicating suspense of measurement reporting to the ENB.

4. The method of claim 1, further comprising:
   determining whether to exit from the dormant mode; and
   sending, upon exit from the dormant mode, a dormant mode exit message to the network.

5. The method of claim 4, wherein the dormant mode exit message comprises at least one of information on time remaining to a next entry into dormant mode and information on dormant mode duration.

6. A method performed by a network to handle operations of a user equipment (UE) in a dormant mode, the method comprising:
   receiving a first message indicating capability of a dormant mode of the UE from the UE;
   sending a second message indicating a capability of a dormant mode of the network to the UE, wherein during the dormant mode data transmission between the UE and network is suspended; and
   receiving a third message including active time information and period information for dormant mode from the UE.

7. The method of claim 6, further comprising:
   receiving, in response to information on results of measurement conducted by the UE in idle mode being to be reported to a base station (ENB) of the network, a dormant mode notification message indicating suspense of measurement reporting from the UE; and
   sending, in response to the dormant mode notification message, a command to report saved measurement information to the UE.

8. The method of claim 6, further comprising:
   receiving a dormant mode exit message indicating exit from dormant mode from the UE; and
   resuming, upon reception of the dormant mode exit message, data transmission for the UE.

9. A user equipment (UE) supporting a dormant mode, the user equipment comprising:
   a transceiver configured to send and receive messages and data to and from a network; and
   a controller configured to control to receive a first message indicating capability of dormant mode of the network from the network; determine whether to enter the dormant mode during which data transmission between the UE and the network is suspended; and send upon determining to enter the dormant mode, a second message including active time information and period information for dormant mode time information to the network.

10. The user equipment of claim 9, wherein the controller is configured to send a message indicating capability of dormant mode of the UE to the network before receiving the first message from the network.

11. The user equipment of claim 9, wherein, in response to information on results of measurement conducted in idle mode being to be reported to a base station (ENB) of the network, the controller is configured to send a dormant mode notification message indicating suspense of measurement reporting to the ENB.

12. The user equipment of claim 9, wherein the controller is configured to determine whether to exit from the dormant mode, and send, via the transceiver, upon exit from the dormant mode, a dormant mode exit message to the network.

13. The user equipment of claim 12, wherein the dormant mode exit message comprises at least one of information on time remaining to a next entry into dormant mode and information on dormant mode duration.

14. A node of a network for handling operations of a user equipment (UE) in a dormant mode, the node comprising:
- an interface configured to send and receive messages and data to and from the UE and other nodes of the network; and
- a controller configured to control to receive a first message indicating capability of dormant mode of the UE from the UE, send a second message indicating capability of dormant mode of the network to the UE, and receive a third message including active time information and period information for dormant mode from the UE.

15. The node of claim 14, wherein, in response to information on results of measurement conducted by the UE in idle mode being to be reported to a base station (ENB) of the network, the interface is configured to receive a dormant mode entry message indicating entry into dormant mode from the UE and send a dormant mode notification message indicating suspense of measurement reporting to the ENB.

16. The node of claim 14, wherein, in response to a dormant mode entry message indicating entry into dormant mode being received from the UE, the interface is configured to send a suspend request message, which notifies of UE entry into dormant mode and requests suspense of downlink data transmission for the UE, to a second node of the network.

17. The node of claim 16, wherein the second node is a serving gateway (S-GW) of the network, and wherein, in response to a notification message indicating generation of downlink data addressed to the UE being received from the S-GW after reception of the dormant mode entry message from the UE, the interface is configured to forward the suspend request message to the S-GW.

18. The node of claim 17, wherein the suspend request message contains information on time remaining to exit from the dormant mode.

19. The node of claim 16, wherein, in response to a dormant mode exit message indicating exit from dormant mode being received from the UE, the interface is configured to send a resume request message, which notifies of exit from dormant mode and requests resumption of downlink data transmission for the UE, to the second node and forwards downlink data from the second node to the UE.

20. The node of claim 19, wherein the second node is a serving gateway (S-GW) of the network, and wherein, in response to a notification message indicating generation of downlink data addressed to the UE being received from the S-GW after sending the resume request message, the interface is configured to send a paging message indicating generation of downlink data to the UE.

21. The node of claim 19, wherein, in response to a context request message being received from a third node of the network according to movement of the UE after reception of the dormant mode exit message from the UE, the interface is configured to send a context response message, which contains at least one of information on dormant mode supportability of the UE, information on time remaining to entry into dormant mode and information on a duration of the dormant mode, to the third node.

* * * * *